(12) United States Patent
Kwon et al.

(10) Patent No.: US 8,723,978 B2
(45) Date of Patent: May 13, 2014

(54) IMAGE FUSION APPARATUS AND METHOD

(75) Inventors: Jae-Hyun Kwon, Hwaseong-si (KR);
Hyun-Hwa Oh, Hwaseong-si (KR);
Won-Hee Choe, Seoul (KR);
Sung-Chan Park, Suwon-si (KR);
Seong-Deok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 13/006,683

(22) Filed: Jan. 14, 2011

(65) Prior Publication Data

US 2011/0176024 A1 Jul. 21, 2011

(30) Foreign Application Priority Data

Jan. 15, 2010 (KR) .................. 10-2010-0004053

(51) Int. Cl.
*H04N 5/228* (2006.01)

(52) U.S. Cl.
USPC ..... 348/222.1; 348/239; 348/234; 348/229.1; 348/235; 348/237; 382/276; 382/299

(58) Field of Classification Search
USPC ........... 348/218.1, 222.1, 234, 235, 237, 239, 348/229.1; 382/276, 299
See application file for complete search history.

(56) References Cited

U.S. PATENT DOCUMENTS

| | | | |
|---|---|---|---|
| 5,929,908 A * | 7/1999 | Takahashi et al. | 348/364 |
| 6,204,881 B1 | 3/2001 | Ikeda et al. | |
| 6,418,245 B1 | 7/2002 | Udagawa | |
| 7,057,585 B2 | 6/2006 | Kang et al. | |
| 7,202,892 B1 | 4/2007 | Ogata et al. | |
| 7,508,421 B2 | 3/2009 | Tamaru et al. | |
| 7,538,802 B2 | 5/2009 | Lee | |
| 2005/0104900 A1 * | 5/2005 | Toyama et al. | 345/629 |
| 2005/0254722 A1 * | 11/2005 | Fattal et al. | 382/274 |
| 2006/0177150 A1 * | 8/2006 | Uyttendaele et al. | 382/284 |
| 2007/0024721 A1 | 2/2007 | Rogers | |
| 2007/0070364 A1 | 3/2007 | Henley | |
| 2008/0266418 A1 | 10/2008 | Imai et al. | |

FOREIGN PATENT DOCUMENTS

| | | |
|---|---|---|
| KR | 10-2003-0043344 | 6/2003 |
| KR | 10-2006-0023291 | 3/2006 |
| KR | 10-2008-0032251 | 4/2008 |
| KR | 10-2008-0096333 | 10/2008 |
| KR | 10-2009-0048191 | 5/2009 |

* cited by examiner

*Primary Examiner* — Antoinette Spinks
(74) *Attorney, Agent, or Firm* — NSIP Law

(57) ABSTRACT

Provided are an image fusion apparatus and method for combining multi-exposure images. The image fusion apparatus and method may generate a sharp high-resolution high dynamic image while fully representing detail in an overexposed region and an under-exposed region of the image without contrast degradation.

20 Claims, 10 Drawing Sheets

IMAGE FUSION APPARATUS AND METHOD

CROSS-REFERENCE TO RELATED APPLICATION

This application claims the benefit under 35 U.S.C. §119 (a) of Korean Patent Application No. 10-2010-0004053, filed on Jan. 15, 2010, in the Korean Intellectual Property Office, the entire disclosure of which is incorporated herein by reference for all purposes.

BACKGROUND

1. Field

The following description relates to an image fusion apparatus and method for composing multi-exposure images obtained from an image sensor, and more particularly, to a multi-exposure image fusion apparatus and method for producing a sharp high-resolution high dynamic range (HDR) image to more fully represent detail in under and over-exposed regions of an image without contrast degradation.

2. Description of the Related Art

Examples of a conventional high dynamic range (HDR) image generation include an image obtaining method using an HDR image sensor and a multi-exposure image composition method. The image obtaining method uses an HDR image sensor to obtain an HDR image directly from an image sensor. The image obtaining method does not perform image synthesis.

The multi-exposure image compositing method includes global/local tone mapping methods, each of which captures a plurality of images with different exposures and generates HDR data. The method includes compressing the HDR data by tone mapping in accordance with a low dynamic range (LDR) to generate an output image.

The global tone mapping method may retain the global contrast, and is simple to calculate. However, in the global tone mapping method, the local contrast is degraded and an unclear image is obtained. The local tone mapping can retain the local contrast, but an inversion phenomenon and halo artifacts may occur, and a large amount of calculations are required.

In addition, the above methods are not sufficient to provide an HDR image corresponding to the recent trend of high quality images and contrast characteristics of human vision.

For example, the multi-exposure image composing method may produce an image with deteriorated quality due to contrast degradation that results from dynamic range compression. The multi-exposure image composing method may cause the occurrence of an inversion phenomenon and halo artifacts. Therefore, a new HDR image generating method that does not reduce global or local contrast is needed.

SUMMARY

In one general aspect, there is provided an image fusion apparatus for combining multi-exposure images obtained by an image sensor, the image fusion apparatus comprising an image capturing and processing unit to obtain a first input image and a second input image that have different exposures, respectively, and to perform motion alignment and exposure processing on the first and second input images, and an image generating unit to generate low-dynamic range (LDR) images by compressing the first input image and the second input image such that each of the first input image and the second input image are divided into regions according to luminance information of the second input image, and to combine the generated LDR images.

The image generating unit may comprise an exposure compensating unit to set an index according to an exposure difference between the first input image and the second input image, to compensate for an exposure of the first input image, and to generate a compensated image, a first image fusion unit to combine the second input image and the compensated image using the luminance information of the second input image on a basis of luminance regions, and to generate the LDR images that comprise a high-luminance compressed image and a low-luminance compressed image, by compressing the combined image on a basis of the luminance regions, and a second image fusion unit to combine the LDR images generated by the first image fusion unit using the luminance information of the second input image.

The exposure compensating unit may calculate a lower luminance threshold and an upper luminance threshold from a luminance mean value and a luminance maximum value of the first input image and may remap an exposure value of the first input image according to the index.

The first image fusion unit may comprise a broadband image fusion unit to generate fusion-weighted images from the luminance information of the second input image with respect to the second input image and the image generated from the exposure compensating unit, and to generate the combined image by combining over-exposed regions and under-exposed regions of the images using the fusion-weighted images, and a compressed image generating unit to generate the LDR images by compressing the combined image based on the over-exposed region and the under-exposed region such that the entire luminance range of the generated LDR images is the same as that of the image generated by the broadband image fusion unit.

The first image fusion unit may further include a fusion weight calculating unit to generate fusion-weighted images for extracting predetermined luminance regions from the respective first input image and second input image according to the corresponding exposures.

The second image fusion unit may generate region-weighted images for an over-exposed region and an under-exposed region using the luminance information of the second input image and may combines the high-luminance compressed image and the low-luminance compressed image, which are generated by the first image fusion unit, using the generated region-weighted images.

The second image fusion unit may include a region-weight calculating unit to generate region-weighted images for extracting predetermined luminance regions from the respective high luminance compressed image and low luminance compressed image which are generated by the first image fusion unit.

The image fusion apparatus may further comprise a high luminance restoration unit to restore luminance of a region of the second input image with reference to a color ratio of the first input image where the region is brighter than a predetermined luminance.

The image fusion apparatus may further comprise a post-processing unit to perform contrast enhancement, to increase luminance in an under-exposed region, and to perform halo artifact reduction on each of the high luminance compressed image and the low luminance compressed image generated by the first image fusion unit.

In another aspect, provided is an image fusion method for combining multi-exposure images obtained by an image sensor, the image fusion method comprising obtaining a first input image and a second input image with different exposures and performing motion alignment and exposure processing on the first and second input images, setting an index according to an exposure difference between the first input image and the second input image and generating a compensated image by compensating for an exposure of the first input image, combining the compensated image and the second input image using the luminance information of the second input image on a basis of luminance regions, and generating low dynamic range (LDR) images by compressing the combined image on a basis of the luminance regions, wherein the LDR images include a high-luminance compressed image and a low-luminance compressed image, and combining the LDR images using the luminance information of the second input image.

The generating of the LDR images may comprise generating fusion-weighted images from the luminance information of the second input image with respect to the second input image and the image generated from the first input image, and generating the combined image by combining over-exposed regions and under-exposed regions of the images using the fusion-weighted images, and generating the LDR images by compressing the combined image based on the over-exposed region and the under-exposed region such that the entire luminance range of the generated LDR images is the same as that of the image generated by the broadband image fusion unit.

The combining of the LDR images may include generating region-weighted images for an over-exposed region and an under-exposed region using the luminance information of the second input image and combining the high-luminance compressed image and the low-luminance compressed image using the generated region-weighted images.

The image fusion method may further comprise generating fusion-weighted images for extracting predetermined luminance regions from the respective first input image and second input image according to the corresponding exposures, generating region-weighted images for extracting predetermined luminance regions from the respective high luminance compressed image and low luminance compressed image, and performing contrast enhancement, increase of luminance in an under-exposed region, and halo artifact reduction on each of the high luminance compressed image and the low luminance compressed image.

In another aspect, there is provided an image generator to generate a combined image, the image generator comprising a first image fusion unit configured to receive a plurality of high dynamic range (HDR) images each with a different exposure, and configured to compress the plurality of HDR images into a plurality of low dynamic range (LDR) images based on a luminance of each HDR image, and a second image fusion unit configured to combine the plurality of LDR images into a combined image, and configured to output the combined image.

The first image fusion unit may compress two HDR images such that the first HDR image is compressed to a first luminance range and the second HDR image is compressed to a second luminance range that partially overlaps the first luminance range.

The plurality of HDR images may include a first HDR image comprising an over-exposed region and a second HDR image comprising an under exposed region, and the first image fusion unit ma compress the first image to a first luminance range of values and may compress the second image to a second luminance range of values that are less in value than the first luminance range of values.

The image generator may further comprise an exposure compensating unit configured to compensate the exposure of at least one of the plurality of HDR images, wherein the plurality of images may include a first image and a second image that have different exposures, the exposure compensating unit may set an index corresponding to an exposure difference between the first image and the second image, and the exposure compensating unit may compensate for the exposure of the first image using the index to generate a compensated image.

The image generator may further comprise a high luminance restoring unit configured to restore color to at least one of the plurality of HDR images, wherein the high luminance restoring unit may restore color to a region of an image that is brighter than a predetermined luminance.

The image generator may further comprise a region weight calculating unit configured to divide each of the plurality of HDR images into regions based on the luminance level of each region, and configured to generate region weighted images that represent each of the divided regions of each respective HDR image.

In another aspect, there is provided an image processing apparatus comprising an image obtaining and processing unit configured to capture a plurality of HDR images having different exposures, an image generating unit configured to compress the plurality of HDR images into a plurality of low-dynamic range (LDR) images based on a luminance of each HDR image, and configured to combine the plurality of LDR images into a combined image, and an image output unit configured to output the combined image.

The generating unit may compress two HDR images such that the first HDR image is compressed to a first luminance range and the second HDR image is compressed to a second luminance range that partially overlaps the first luminance range.

The plurality of captured HDR images may include a first HDR image comprising an over-exposed region and a second HDR image comprising an under exposed region, and the image generating unit may compress the first HDR image to a first luminance range of values and may compress the second HDR image to a second luminance range of values that are less in value than the first luminance range of values.

The image generating unit may comprise a first image fusion unit configured to receive the plurality of HDR images having different exposures, and configured to compress the plurality of HDR images into the plurality of LDR images based on a luminance of each HDR image, and a second image fusion unit configured to combine the plurality of LDR images into a combined image, and configured to output the combined image.

Other features and aspects will be apparent from the following detailed description, the drawings, and the claims.

Figure 1:
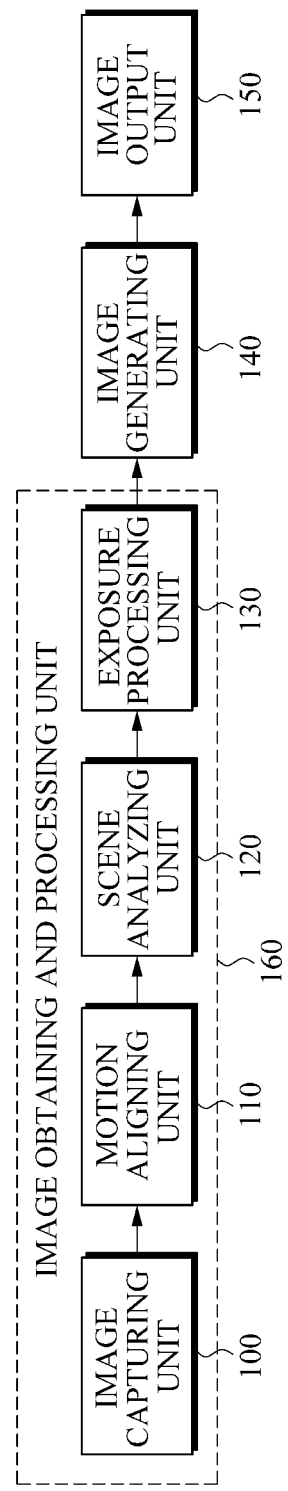
FIG. 1 is a diagram illustrating an example of an image fusion apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an image fusion apparatus.

Referring to FIG. 1, the image fusion apparatus includes an image capturing unit 100, a motion aligning unit 110, a scene analyzing unit 120, an exposure processing unit 130, an image generating unit 140, and an image output unit 150. As described herein, the image fusion apparatus may be used to process images and may also be referred to as an image processor. The image fusion apparatus may be included in or may be a camera, a terminal, a mobile phone, and the like.

The image capturing unit 100 receives a high dynamic range (HDR) image or a plurality of images captured with different exposures from an image sensor or a camera.

The captured images may be processed by the motion aligning unit 110 to perform motion alignment. For example, the motion alignment may be in response to inter-frame global motion and object motion that may occur in the captured images. By performing the motion alignment processing, image overlap may be prevented.

The scene analyzing unit 120 analyzes a scene, for example, based on image data and information of exposure during image acquisition. If desired, the exposure processing unit 130 performs an exposure compensation process to produce an image with the same exposure or approximately the same exposure as image data obtained with an appropriate exposure.

In response to the scene analysis result, the scene analyzing unit 120 and the exposure processing unit 130 may perform exposure compensation on an image obtained with an inappropriate exposure. For example, the scene analyzing unit 120 and the exposure processing unit 130 may perform exposure compensation on an image having a saturated luminance region. In this example, if RAW data that is generated by an image sensor and has a linear input-output relationship is used, accurate exposure compensation may be realized.

The scene analyzing unit 120 and the exposure processing unit 130 may perform detail enhancement processing, in addition to the exposure compensation processing, using an unsharp masking method, for example, as in Equation 1 below.

$$p'_k(i,j) = P_k(i,j) - \alpha(i,j) \cdot \bar{p}_k(i,j) \cdot (1-\epsilon)$$

$$k = R, G, B$$

$$\bar{p}_k(i,j): \text{blurred version } P_k(i,j)$$

$$\alpha: \text{unsharp coefficient}$$

$$\epsilon: \text{exposure ratio} \quad (1)$$

The image capturing unit 100, the motion aligning unit 110, the scene analyzing unit 120, and the exposure processing unit 130 may be implemented separately according to their functionality as shown in the example illustrated in FIG. 1. However, it should also be appreciated that two or more of these units may be implemented as a single unit such as an image obtaining and processing unit 160 that obtains images with different exposures and performs image processing such as motion alignment, exposure processing, and/or detail enhancement to produce images to be combined.

The image generating unit 140 combines the images that have undergone the above is image processing, compresses the combined images to a low dynamic range (LDR) to generate LDR images, and synthesizes the LDR images to generate an output image. For example, if the image generating unit 140 receives an HDR image, the motion alignment processing by the motion aligning unit 110 and the image synthesis processing by the image generating unit 140 may be omitted.

The image generating unit 140 may perform the synthesis processing, for example, using camera output red, green, blue (RGB) data or image sensor RAW data. The output image generated by the image generating unit 140 is displayed through the image output unit 150.

Figure 2:
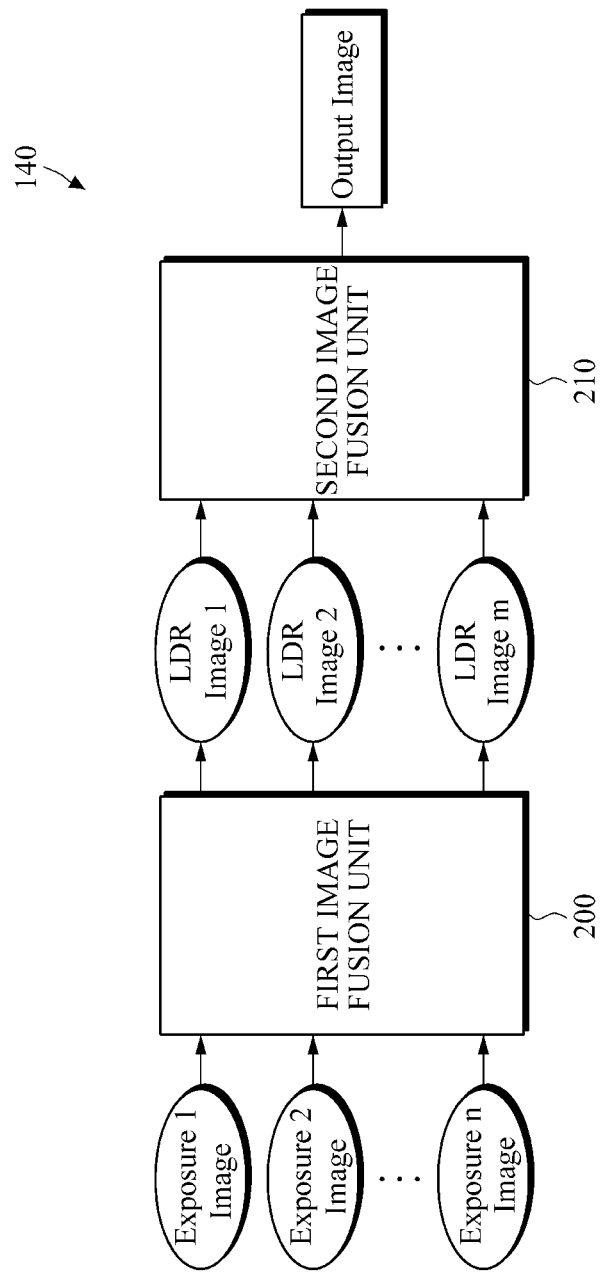
FIG. 2 is a diagram illustrating an example of an image generating unit.

FIG. 2 illustrates an example of an image generating unit.

Referring to FIG. 2, the image generating unit 140 includes a first image fusion unit 200 and a second image fusion unit 210. The image generating unit may also be referred to as an image processor.

For example, the first image fusion unit 200 may generate HDR data using n input images (where n is an integer) with different exposures and exposure information of each input image. For example, the first image fusion unit 200 may generate m LDR images (where m is an integer) for each luminance interval using the HDR data. The second image fusion unit 210 may combine the m LDR images spatially to generate an output image. As another example, the first image fusion unit 200 and the second image fusion unit 210 may use image sensor RAW data in addition to camera output RGB data.

Figure 3:
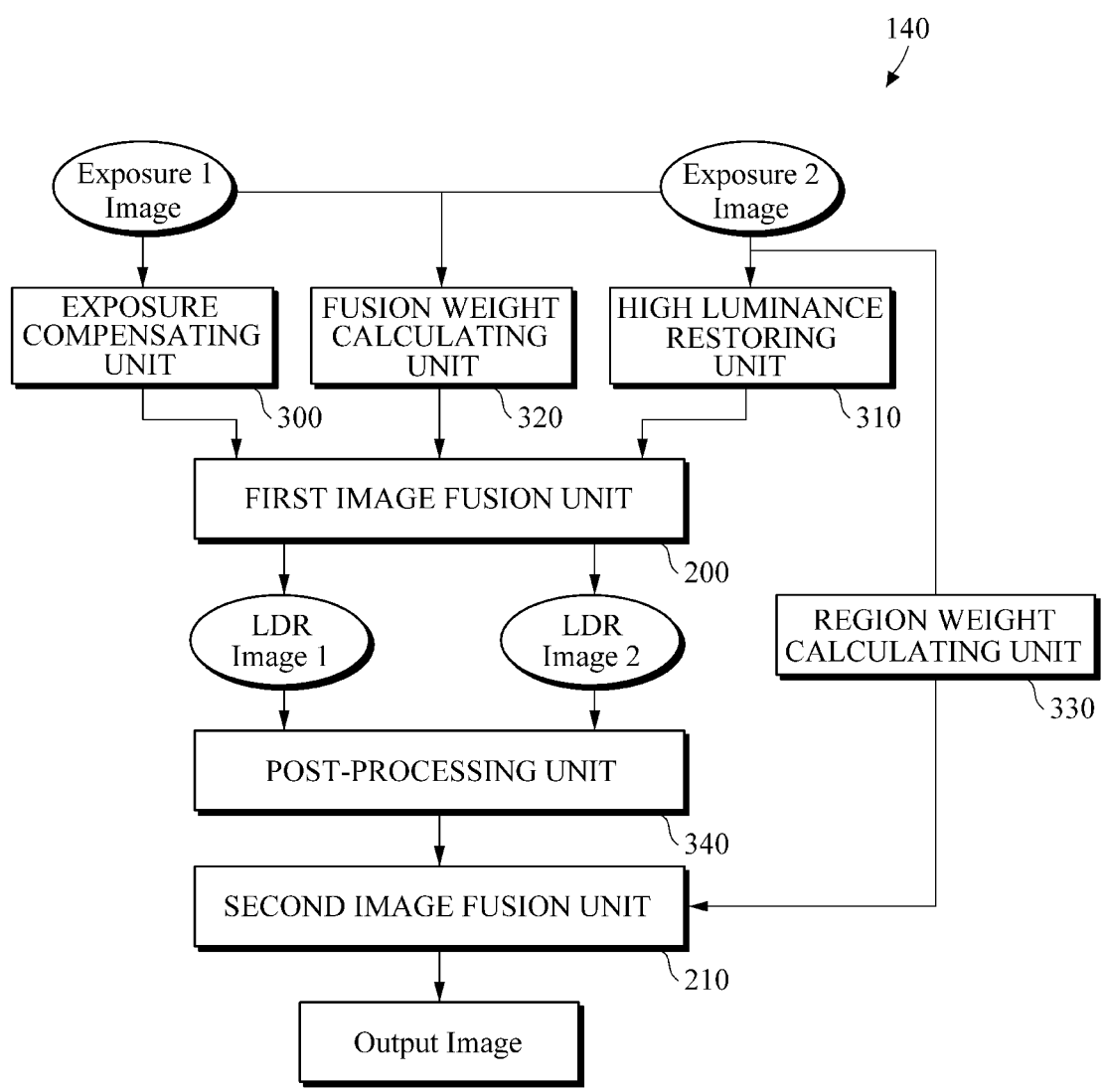
FIG. 3 is a diagram illustrating another example of an image generating unit.

FIG. 3 illustrates another example of an image generating unit.

Referring to FIG. 3, in this example, the image generating unit 140 further includes an exposure compensating unit 300, a high luminance restoring unit 310, a fusion weight calculating unit 320, a region weight calculating unit 330, and a post-processing unit 340 in addition to the first image fusion unit 200 and the second image fusion unit 210 which are illustrated in FIG. 2.

FIG. 3 illustrates an example for processing and synthesizing a first input image (represented as "EXPOSURE 1 IMAGE" in FIG. 3) and a second input image (represented as "EXPOSURE 2 IMAGE" in FIG. 3) which are obtained with different exposures.

The exposure compensating unit 300 may set an index corresponding to an exposure difference between images, for example, the first input image and the second input image, and may compensate for the exposure of one or more images, for example, the first input image using the index to generate a compensated image.

Figure 4:
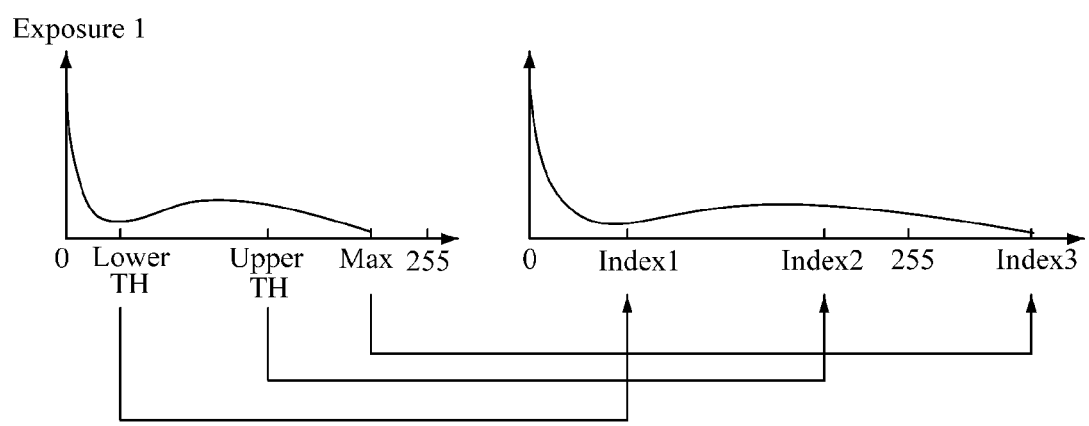
FIG. 4 is a graph illustrating an example of how exposure difference compensation is performed in an exposure compensating unit.

FIG. 4 is a graph that illustrates how exposure difference compensation is performed in an exposure compensating unit, for example, the exposure compensating unit illustrated in FIG. 3.

Referring to FIG. 4, for example, a lower luminance threshold (represented as "LOWER TH" in FIG. 4), an upper luminance threshold (represented as "UPPER TH" in FIG. 4), and a maximum luminance (represented as "MAX" in FIG. 4) may be calculated using a luminance mean value and a luminance maximum value in the first input image (EXPOSURE 1 IMAGE in FIG. 3). An index may be set in consideration of an exposure difference between the first input image and the second input image. The exposure difference may be compensated by remapping the first input image that was obtained with a smaller exposure using the index.

The high luminance restoring unit 310 may restore color information of a region of one or more the input images. For example the high luminance restoring unit 310 may restore color information of a region of the second input image with reference to a color ratio of the first input image. For example, the high luminance restoring unit 310 may restore color of a region that is brighter than a predetermined luminance.

For example, if the first input image and the second input image are obtained from the same scene but with different exposures, and saturation occurs in an over-exposed region of the second input image due to increase of the quantity of incident light and no saturation occurs in an over-exposed region of the first input image, the over-exposed region of the second input image that is brighter than a predetermined luminance may have its color information restored with reference to a color ratio of the corresponding region of the first input image.

The first image fusion unit 200 may combine the second input image and the image generated by the exposure compensating unit 300 for each luminance region according to the luminance information of the second input image.

Figure 5:
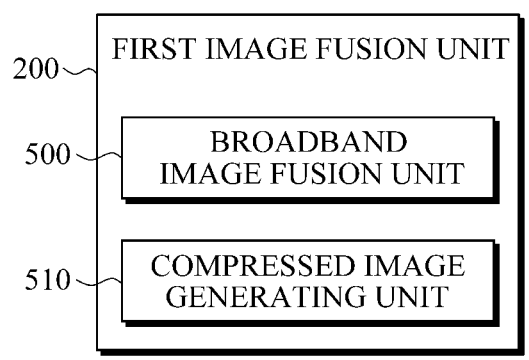
FIG. 5 is a diagram illustrating an example of a first image fusion unit.

FIG. 5 illustrates an example of a first image fusion unit.

Referring to FIG. 5, first image fusion unit 200 includes a broadband image fusion unit 500 and a compressed image generating unit 510.

The broadband image fusion unit 500 may generate fusion-weighted images based on luminance information. For example, the broadband image fusion unit 500 may generate fusion-weighted images based on luminance information of the second input image with respect to the image generated by the exposure compensating unit 300 and the second input image. For example, the broadband image fusion unit 500 may generate HDR data by synthesizing an over-exposed region of the image generated by the exposure compensating unit 300 and an under-exposed region of the second input image using the corresponding fusion-weighted images.

For example, the fusion-weighted images may be generated directly by the broadband image fusion unit 500 of the first image fusion unit 200. As another example, the fusion-weighted images may be generated directly from luminance information of the two input images using a separate unit such as the fusion weight calculating unit 320 shown in the example illustrated in FIG. 3.

The first image fusion unit 200 may use the luminance information of the second input image to obtain a weighted average of each pixel, and may generate fusion-weighted images for the respective first and second input images.

Using the fusion-weighted images, the over-exposed regions and the under-exposed regions of the input images may be combined with each other, and HDR data may be generated from the combined images.

For example, the weighted average may be calculated using a contrast blending method.

The compressed image generating unit 510 may generate images by compressing the combined image. For example, the compressed image generating unit 510 may compress the combined image based on the over-exposed region and the under-exposed region, for example, such that the entire luminance range of the generated compressed images is the same as that of the image generated by the broadband image fusion unit 500.

Figure 6:
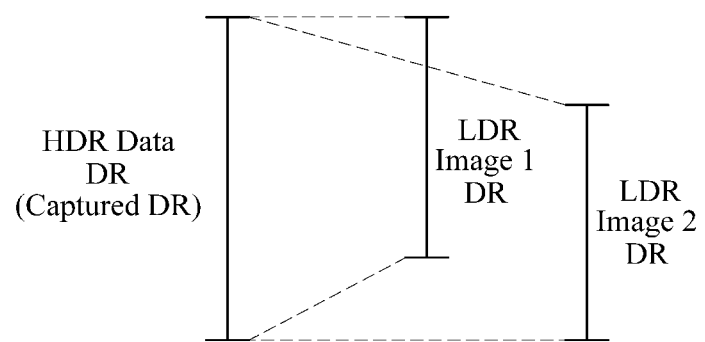
FIG. 6 is a diagram illustrating an example of a luminance range of an image compressed by a compressed image generating unit.

FIG. 6 illustrates an example of luminance ranges of images generated by a compressed image generating unit.

Referring to FIG. 5 and FIG. 6, the compressed image generating unit 510 may compress the HDR data generated by the broadband image fusion unit 500 such that margin values (the maximum value and the minimum value) of a luminance range of the HDR data are mapped to margin values (the maximum value and the minimum value) of luminance ranges of the compressed images (denoted by "LDR IMAGE 1" and "LDR IMAGE 2") generated by the compressed image generating unit 510.

Figure 7A:
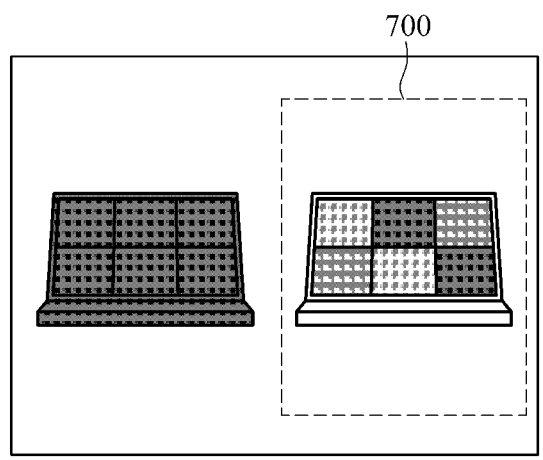
FIG. 7A is a diagram illustrating an example of an image compressed based on an over-exposed region by the compressed image generating unit.
Figure 7B:
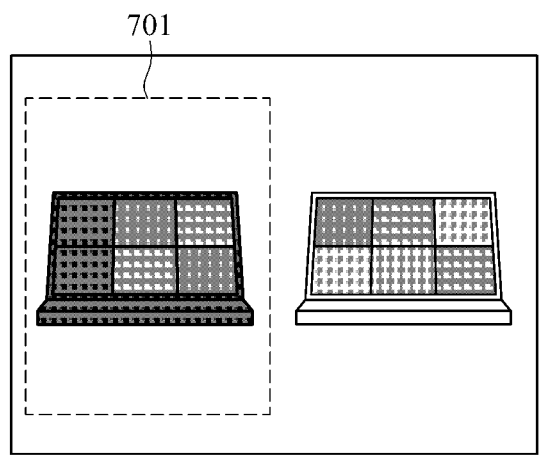
FIG. 7B is a diagram illustrating an example of an image compressed based on an under-exposed region by the compressed image generating unit.

FIG. 7A illustrates an example of an image compressed based on the over-exposed region by a compressed image generating unit. FIG. 7B illustrates an example of an image compressed based on the under-exposed region by a compressed image generating unit.

The example shown in FIG. 7A may correspond to the high luminance compressed image LDR IMAGE 1 shown in FIG. 6, and the example shown in FIG. 7B may correspond to the low luminance compressed image LDR IMAGE 2 shown in FIG. 6.

Region 700 shown in FIG. 7A corresponds to an over-exposed region in which a high-luminance region appears. Region 710 shown in FIG. 7B corresponds to an under-exposed region in which a low-luminance region appears.

For example, the images combined by the first image fusion unit 200 may be transmitted to the post-processing unit 340 (see FIG. 3). Accordingly, the post-processing unit 340 may perform various processes on the compressed images. For example, the post-processing unit 341 may process the high luminance compressed image LDR IMAGE 1 and the low luminance compressed image LDR IMAGE 2, which are generated by the first image fusion unit 200, in order to improve image quality of an output image.

For example, the images LDR IMAGE 1 and LDR IMAGE 2 from the first image fusion unit 200 may undergo additional post-processing as described herein, and a variety of methods may be used to improve the quality of an output image.

For example, the post-processing may include contrast enhancement, increase of luminance in an under-exposed region, halo artifact reduction, and the like.

In the example shown in FIG. 7A, a region other than the region 700 may correspond to an under-exposed region, and thus, it may be difficult for shapes of objects present in the under-exposed region to be clearly seen. Therefore, to enhance image quality of a final output image, luminance of the under-exposed region may be improved before image synthesis.

For example, the luminance of the under-exposed region in the high luminance compressed image shown in FIG. 7A may be increased using the weighted image for increasing the luminance of the under-exposed region.

As another example, the low luminance compressed image shown in FIG. 7B is blurry, and thus, shapes of objects present in the image are not distinct. In this example, to improve the image quality of a final output image, sharpness of outlines of the objects present in the low luminance compressed image may be increased before image synthesis.

For example, halo artifact reduction may be performed on the image using the weighted image for improving the sharpness of outlines of the objects in the low luminance image shown in FIG. 7B.

Over-exposed regions of each of the weighted image for increasing the luminance of the under-exposed region and the weighted image for improving sharpness of outlines are portions to which the weight may be applied. Regions of the original images LDR IMAGE 1 and LDR IMAGE 2 corresponding to the over-exposed regions of the respective weighted images may be applied with the weights to enhance the image quality.

After the post-processing, the LDR images may be combined together to generate a final output image.

For example, the second image fusion unit 210 may generate an output image by combining the high luminance compressed image LDR IMAGE 1 and the low luminance is compressed image LDR IMAGE 2 using LDR image fusion. In the course of LDR image fusion processing, an image which has a weighted region is generated. For example, a weighted image may be generated directly by the second image fusion unit 210, or may be generated by the region weight calculating unit 330 as shown in the example illustrated in FIG. 3.

The region weight calculating unit 330 may divide an image into regions according to luminance level, and may generate region-weighted images which are aimed at representing detail in each divided region as distinctly as possible with high contrast. For example, the region weight calculating unit 330 may divide each image received by the image generating unit 140 into various regions based on luminance.

For example, the region weight calculating unit 330 may create region-weighted images, respectively, for an over-exposed region and an under-exposed region using luminance information of the second input image.

In response to the receipt of the high luminance compressed image shown in FIG. 7A and the low luminance compressed image shown in FIG. 7B, the second image fusion unit 210 may generate an output image by combining the high luminance compressed image and the low luminance compressed image using the region-weighted images generated by the region weight calculating unit 330.

For example, an image which is based on region 700 of the high luminance compressed image illustrated in FIG. 7A may be extracted from an over-exposed region of the region-weighted image for combining the high luminance images. The image has an over-exposed region represented clearly.

Thereafter, an image which is based on region 710 of the low luminance compressed image illustrated in FIG. 7B may be extracted from an over-exposed region of the region-weighted image for combining the low luminance images. The image has an under-exposed region represented clearly.

The extracted images may be combined to generate an output image. For example, when an image is divided into two or more regions and the regions are combined, the regions may be divided according to a variable luminance threshold.

Figure 8:
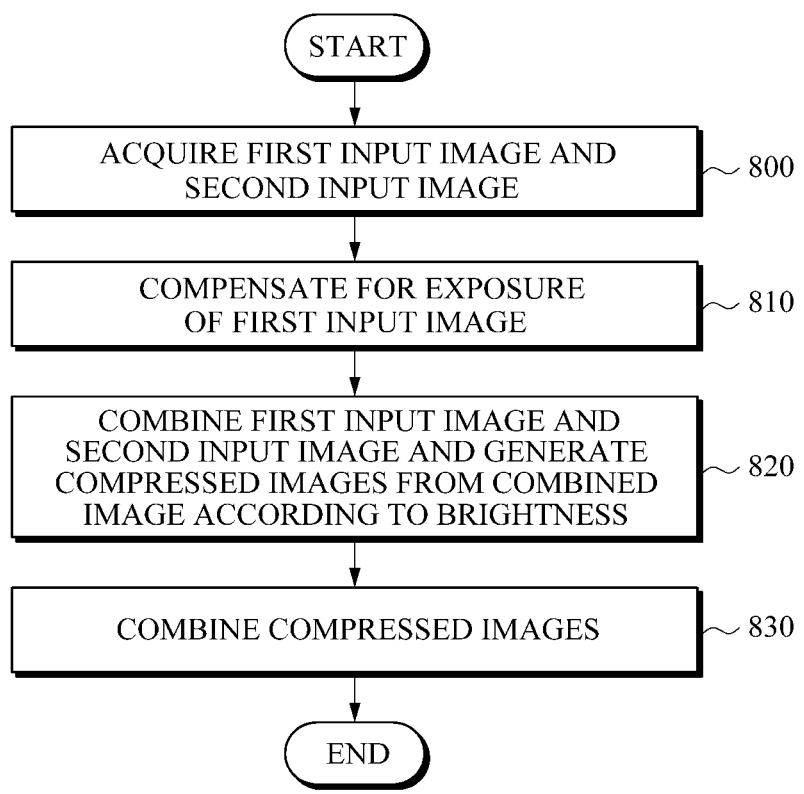
FIG. 8 is a flowchart of an example of an image fusion method.

FIG. 8 illustrates an example of an image fusion method.

Referring to FIG. 8, a first input image and a second input image are acquired with different exposures from the same object, and image processing operations such as motion alignment, exposure compensation, and/or detail enhancement are performed on the first and second input images to generate images appropriate to image fusion, in 800.

An index is set according to an exposure difference between the first input image and the second input image, and an image in which the exposure of the first input image is compensated is generated, in 810.

The second input image and an image generated using the luminance information of the second input image are combined together on the basis of luminance regions, and the combined images are compressed on the basis of the luminance regions, in 820.

The compressed images are combined together to generate an output image, in 830. The output image is displayed.

Figure 9:
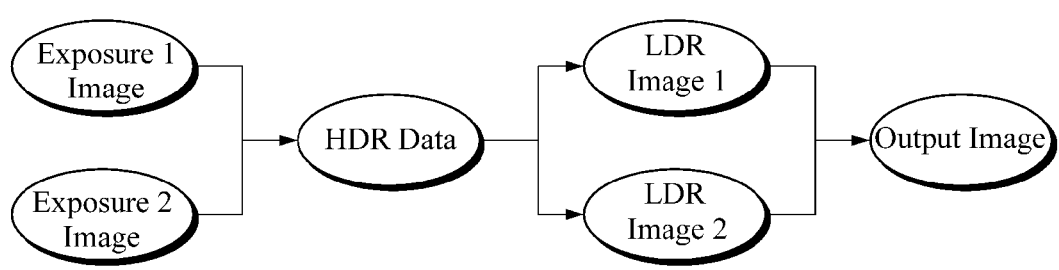
FIG. 9 is a diagram illustrating an example of images generated by an image fusion apparatus to generate an output image.

FIG. 9 illustrates an example of images generated by an image fusion apparatus to generate an output image.

For example, HDR data may be generated from a first input image (EXPOSURE 1 IMAGE) and a second input image (EXPOSURE 2 IMAGE) through the above described exposure compensating unit 300, high luminance restoring unit 310, and first image fusion unit 200. The LDR images (LDR IMAGE 1 and LDR IMAGE 2) may be generated by compressing the HDR data on the basis of the luminance. From the generated LDR images (LDR IMAGE 1 and LDR IMAGE 2), a final output image may be generated through the post-processing unit 340 and the second image fusion unit 210.

The methods, processes, functions, and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld is e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image fusion apparatus for combining multi-exposure images obtained by an image sensor, the image fusion apparatus comprising:
    an image capturing and processing unit to obtain a first input image and a second input image that have different exposures, respectively, and to perform motion alignment and exposure processing on the first and second input images; and
    an image generating unit to generate low-dynamic range (LDR) images by compressing the first input image and the second input image such that each of the first input image and the second input image are divided into regions according to luminance information of the second input image, and to combine the generated LDR images.

2. The image fusion apparatus of claim 1, wherein the image generating unit comprises:
    an exposure compensating unit to set an index according to an exposure difference between the first input image and the second input image, to compensate for an exposure of the first input image, and to generate a compensated image;
    a first image fusion unit to combine the second input image and the compensated image using the luminance information of the second input image on a basis of luminance regions, and to generate the LDR images that comprise a high-luminance compressed image and a low-luminance compressed image, by compressing the combined image on a basis of the luminance regions; and
    a second image fusion unit to combine the LDR images generated by the first image fusion unit using the luminance information of the second input image.

3. The image fusion apparatus of claim 2, wherein the exposure compensating unit calculates a lower luminance threshold and an upper luminance threshold from a luminance mean value and a luminance maximum value of the first input image and remaps an exposure value of the first input image according to the index.

4. The image fusion apparatus of claim 2, wherein the first image fusion unit comprises:
    a broadband image fusion unit to generate fusion-weighted images from the luminance information of the second input image with respect to the second input image and the image generated from the exposure compensating unit, and to generate the combined image by combining over-exposed regions and under-exposed regions of the images using the fusion-weighted images; and
    a compressed image generating unit to generate the LDR images by compressing the combined image based on the over-exposed region and the under-exposed region such that the entire luminance range of the generated LDR images is the same as that of the image generated by the broadband image fusion unit.

5. The image fusion apparatus of claim 4, wherein the first image fusion unit further includes a fusion weight calculating unit to generate fusion-weighted images for extracting predetermined luminance regions from the respective first input image and second input image according to the corresponding exposures.

6. The image fusion apparatus of claim 2, wherein the second image fusion unit generates region-weighted images for an over-exposed region and an under-exposed region using the luminance information of the second input image and combines the high-luminance compressed image and the low-luminance compressed image, which are generated by the first image fusion unit, using the generated region-weighted images.

7. The image fusion apparatus of claim 2, wherein the second image fusion unit includes a region-weight calculating unit to generate region-weighted images for extracting predetermined luminance regions from the respective high luminance compressed image and low luminance compressed image which are generated by the first image fusion unit.

8. The image fusion apparatus of claim 2, further comprising:
    a high luminance restoration unit to restore luminance of a region of the second input image with reference to a color ratio of the first input image where the region is brighter than a predetermined luminance.

9. The image fusion apparatus of claim 2, further comprising:
    a post-processing unit to perform contrast enhancement, to increase luminance in an under-exposed region, and to perform halo artifact reduction on each of the high luminance compressed image and the low luminance compressed image generated by the first image fusion unit.

10. An image fusion method for combining multi-exposure images obtained by an image sensor, the image fusion method comprising:
    obtaining a first input image and a second input image with different exposures and performing motion alignment and exposure processing on the first and second input images;
    setting an index according to an exposure difference between the first input image and the second input image and generating a compensated image by compensating for an exposure of the first input image;
    combining the compensated image and the second input image using the luminance information of the second input image on a basis of luminance regions, and generating low dynamic range (LDR) images by compressing the combined image on a basis of the luminance regions, wherein the LDR images include a high-luminance compressed image and a low-luminance compressed image; and
    combining the LDR images using the luminance information of the second input image.

11. The image fusion method of claim 10, wherein the generating of the LDR images comprises:

generating fusion-weighted images from the luminance information of the second input image with respect to the second input image and the image generated from the first input image, and generating the combined image by combining over-exposed regions and under-exposed regions of the images using the fusion-weighted images; and generating the LDR images by compressing the combined image based on the over-exposed region and the under-exposed region such that the entire luminance range of the generated LDR images is the same as that of the image generated by the broadband image fusion unit.

12. The image fusion method of claim 10, wherein the combining of the LDR images include generating region-weighted images for an over-exposed region and an under-exposed region using the luminance information of the second input image and combining the high-luminance compressed image and the low-luminance compressed image using the generated region-weighted images.

13. The image fusion method of claim 10, further comprising:

generating fusion-weighted images for extracting predetermined luminance regions from the respective first input image and second input image according to the corresponding exposures;

generating region-weighted images for extracting predetermined luminance regions from the respective high luminance compressed image and low luminance compressed image; and performing contrast enhancement, increase of luminance in an under-exposed region, and halo artifact reduction on each of the high luminance compressed image and the low luminance compressed image.

14. An image generator to generate a combined image, the image generator comprising:

a first image fusion unit configured to receive a plurality of high dynamic range (HDR) images each with a different exposure, and configured to compress the plurality of HDR images into a plurality of low dynamic range (LDR) images such that each HDR image is divided into a plurality of regions based on a luminance threshold of one of the HDR image; and a second image fusion unit configured to combine the plurality of LDR images into a combined image, and configured to output the combined image.

15. The image generator of claim 14, wherein the first image fusion unit compresses two HDR images such that the first HDR image is compressed to a first luminance range and the second HDR image is compressed to a second luminance range that partially overlaps the first luminance range.

16. The image generator of claim 14, wherein the plurality of HDR images include a first HDR image comprising an over-exposed region and a second HDR image comprising an under exposed region, and the first image fusion unit compresses the first image to a first luminance range of values and compresses the second image to a second luminance range of values that are less in value than the first luminance range of values.

17. The image generator of claim 14, further comprising an exposure compensating unit configured to compensate the exposure of at least one of the plurality of HDR images, wherein the plurality of images include a first image and a second image that have different exposures, the exposure compensating unit sets an index corresponding to an exposure difference between the first image and the second image, and the exposure compensating unit compensates for the exposure of the first image using the index to generate a compensated image.

18. The image generator of claim 14, further comprising a high luminance restoring unit configured to restore color to at least one of the plurality of HDR images, wherein the high luminance restoring unit restores color to a region of an image that is brighter than a predetermined luminance.

19. The image generator of claim 14, further comprising a region weight calculating unit configured to divide each of the plurality of HDR images into the plurality of regions based on the luminance level of each region, and configured to generate region weighted images that represent each of the divided regions of each respective HDR image.

20. The image generator of claim 14, wherein the first image fusion unit is configured to compress the plurality of HDR images such that a maximum value and a minimum value of luminance ranges of the plurality of HDR images are mapped to a maximum value and a minimum value of luminance ranges of the plurality of compressed images.

* * * * *